United States Patent [19]

Cox

[11] 4,071,793
[45] Jan. 31, 1978

[54] FIELD SUBASSEMBLY FOR ELECTRIC MOTORS

[75] Inventor: Denis Charles Cox, Niedernhausen, Germany

[73] Assignee: The Black and Decker Manufacturing Company, Towson, Md.

[21] Appl. No.: 780,521

[22] Filed: Mar. 23, 1977

Related U.S. Application Data

[63] Continuation of Ser. No. 711,902, Aug. 5, 1976, abandoned, which is a continuation of Ser. No. 590,076, June 25, 1975, abandoned.

[51] Int. Cl.² ............................................. H02K 11/00
[52] U.S. Cl. ......................................... 310/71; 310/217
[58] Field of Search ............................ 310/71, 216–218, 310/68 R, 43, 50, 47; 339/125 R, 221 R, 192

[56] References Cited

U.S. PATENT DOCUMENTS

| 2,688,103 | 8/1954 | Sheldon | 310/71 UX |
|---|---|---|---|
| 3,541,493 | 11/1970 | Morrill | 339/125 R |
| 3,725,707 | 4/1973 | Leimbach et al. | 310/71 |
| 3,760,339 | 9/1973 | Marshall | 336/192 X |
| 3,780,323 | 12/1973 | Swain | 310/71 X |
| 3,862,492 | 1/1975 | Crabb | 310/71 X |
| 3,912,957 | 10/1975 | Reynolds | 310/71 |
| 3,979,615 | 9/1976 | Neff | 310/71 |
| 3,984,712 | 10/1976 | Hill | 310/71 |
| 3,984,908 | 10/1976 | Ackley | 310/71 X |
| 4,004,169 | 1/1977 | Charlton | 310/71 |
| 4,028,570 | 6/1977 | Kieffer | 310/71 X |
| 4,038,573 | 7/1977 | Hillyer et al. | 310/71 |

*Primary Examiner*—Donovan F. Duggan
*Attorney, Agent, or Firm*—Edward D. Murphy; Leonard Bloom; Walter Ottesen

[57] ABSTRACT

A field subassembly for a dynamo electric machine comprises a plurality of laminations secured together to form a stack, the stack having at least two spaced pole pieces and a pair of coil slots per pole piece, a field coil in each one of the pairs of slots, apertures in said stack, each aperture being located in one of the regions between adjacent pole pieces, and electrically-insulating terminal blocks mounted on the stack, each of said blocks being associated with one of the apertures, and each of the blocks having an external configuration corresponding to the region between said pole pieces and such that the blocks do not extend either externally of the stack in a radial direction or within the stack.

24 Claims, 9 Drawing Figures

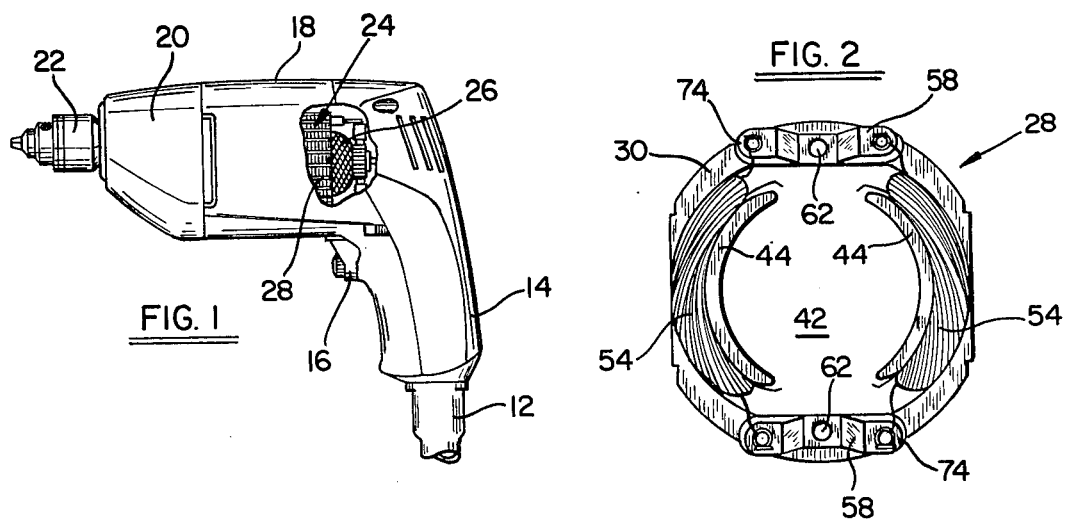
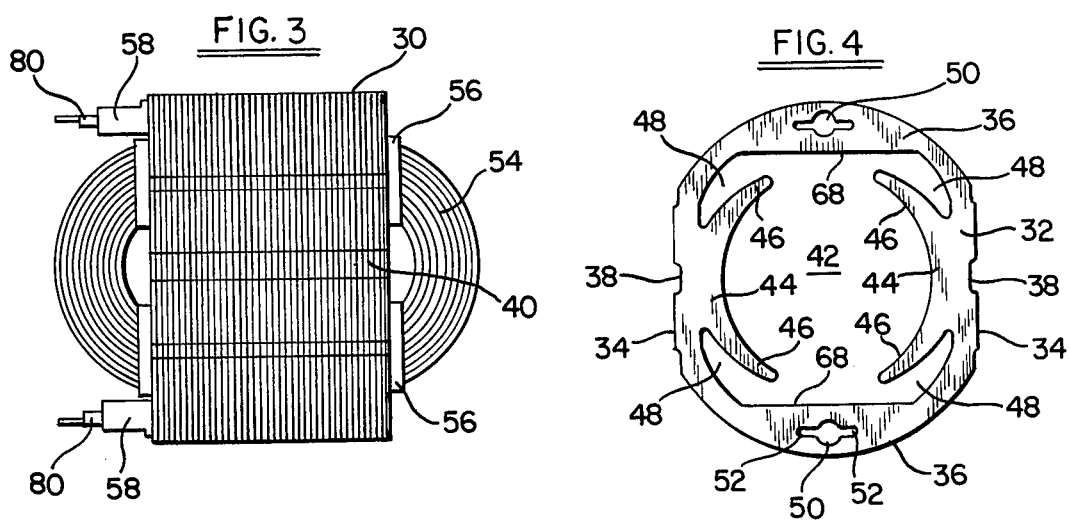
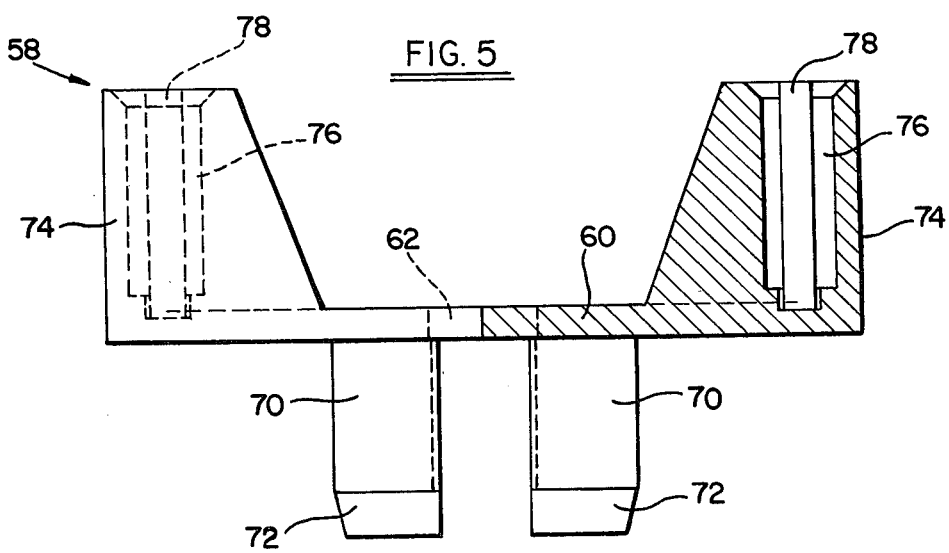

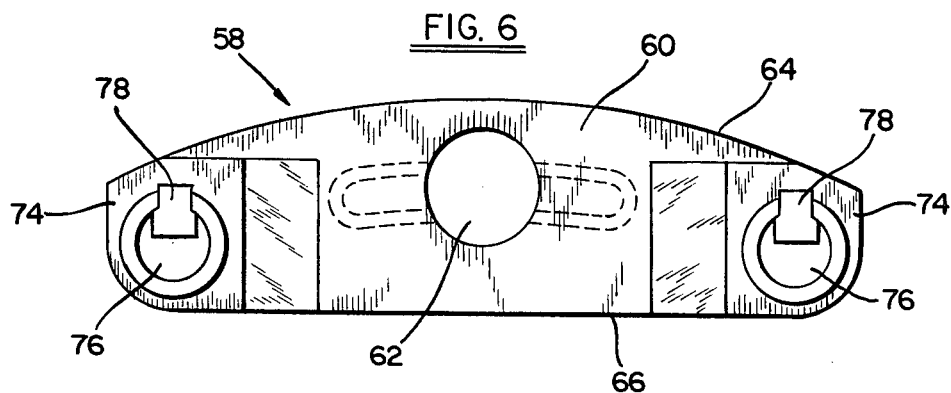
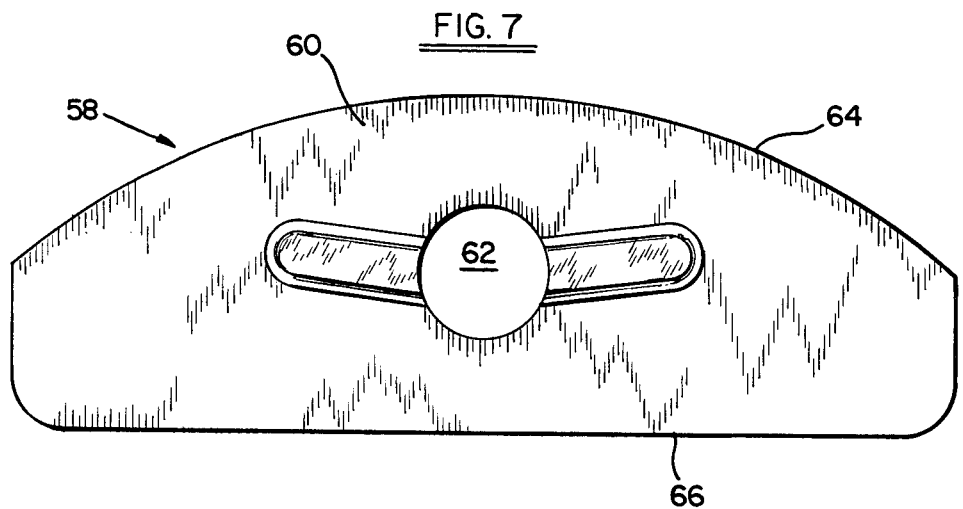
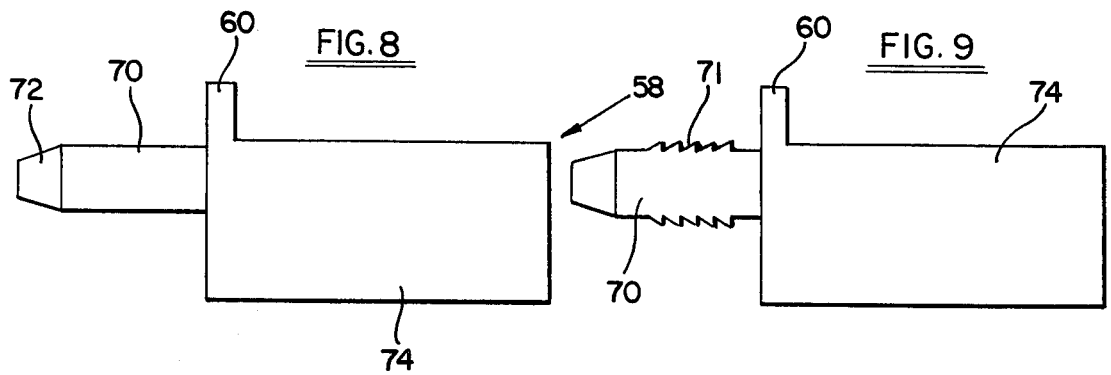

FIELD SUBASSEMBLY FOR ELECTRIC MOTORS

This is a continuation of application, Ser. No. 711,902, filed Aug. 5, 1976, now abandoned which is in turn a continuation of Ser. No. 590,076, filed June 25, 1975, now abandoned.

This invention relates to dynamo electric machines and has particular reference to stator assemblies for such machines, especially small horsepower electric motors.

In the manufacture of such motors, it is becoming increasingly common practice to wind the field coils mechanically on to the stator and to provide terminations on the latter for receiving the ends of the field coil windings and which facilitate electrical connection of the windings to the commutator brushes.

It is an object of the present invention to provide a stator assembly of relatively simple construction which allows the field coils to be wound mechanically to be readily connectable electrically to other electric circuits.

A further object of this invention is the provision of a stator assembly adapted for automatic winding and connection of coils thereon which provides clear air flow paths within the stator.

It is also an object to provide such a stator assembly which is arranged for convenient mounting within a housing.

Another object of this invention is the provision of a stator assembly including a stack of field laminations and a plurality of coils which is adapted for automatic connection of the coils to terminal means mounted on the stack wherein the terminal means and mounting means lie entirely within an area defined by the outline of the field laminations.

According to the present invention a stator assembly for a dynamo electric machine comprises a plurality of laminations secured together to form a stack, the stack having at least two spaced pole pieces and a pair of coil slots per pole piece, a field coil in each one of the pairs of slots, apertures in said stack, each aperture being located in one of the regions between adjacent pole pieces, and electrically-insulating terminal blocks mounted on the stack, each of said blocks being associated with one of the apertures, and each of the blocks having an external configuration corresponding to the region between said pole pieces and such that the blocks do not extend either externally of the stack in a radial direction or within the stack.

In use, terminal means are supported by the terminal blocks and are adapted to receive and connect electrically with the field coils.

The apertures in the stack may both include a cylindrical portion for receiving a stack mounting bolt and in this case each of the terminal blocks has an aperture aligned with the cylindrical portion of one of the apertures in the stack.

Each aperture in the stack may have at least one lateral extension for receiving a prong extending from the terminal mounting block.

Preferably each aperture has two such laternal extensions and each mounting block has two prongs.

By way of example only, a stator assembly embodying the invention will now be described in greater detail with reference to the accompanying drawings of which:

FIG. 1 is a side elevation, partially cut away, of a power tool embodying the motor of the present invention.

FIG. 2 is an end view of the stator assembly.

FIG. 3 is a side view of the stator assembly.

FIG. 4 is a plan view of a component of the assembly.

FIG. 5 is a side view partly in section of another component on a larger scale.

FIG. 6 is a plan view of the component shown in FIG. 5.

FIG. 7 is a bottom plan view, on a still larger scale, of the component shown in FIG. 5.

FIG. 8 is a side view of the component shown in FIG. 5, and

FIG. 9 is a view similar to FIG. 8 of an alternative embodiment.

The portable power tool shown by way of example in FIG. 1 is an electric drill 10 having a power cord 12, handle 14, switch 16, motor housing 18, gear case 20 and chuck 22. Electric power is supplied through cord 12 to a motor 24 under control of the switch 16 to drive the chuck 22 and a bit or other implement mounted therein. The motor 24 includes an armature 26 and a field or stator assembly 28 which is constructed in accordance with the present invention.

The field assembly 28, seen from one end in FIG. 2, comprises a stack 30 of laminations, and individual lamination 32 being shown in plan view in FIG. 4. Each lamination is of magnetic material and is of generally rectangular form when seen in plan having flat sides 34 and rounded ends 36. The flat sides are recessed as at 38 to facilitate welding the laminations together to form the stack and to accommodate the weld 40.

Each lamination has a central bore 42 to receive the armature 26 and into the bore extend pole pieces 44 whose faces are of arcuate shape as shown in FIG. 4. The leading and lagging tips 46 of the pole pieces 44 are spaced by coil slots 48 from the body of the lamination.

Each lamination also has a circular hole 50 adjacent each rounded end 36, the holes having lateral extensions 52 whose longitudinal axes are inclined slightly towards the center of the bore 42.

The slots 48 accommodate the turns of field coils 54 shown in FIGS. 2 and 3, the coils being electrically insulated from the adjacent surfaces of the laminations by sheets 56 of electrically insulating material in the usual manner. The sheets 14 project slightly beyond the end surfaces of the stack 30.

Secured at one end of the stack 30 between the pole pieces 44 are terminal block 58 one of which is shown in FIGS. 5–8 on an enlarged scale.

Each block 58 has a base 60 apertured centrally at 62. The base is shaped to conform closely to the contour of that part of the face of the lamination in the vicinity of the hole 50. Thus the base has a curved edge 64 whose curvature corresponds to that of the rounded end 36 and a linear edge 66 corresponding to the straight internal surface 68 of the lamination. The dimensions of the base 60 are such that is does not extend either radially externally or internally of the lamination, that is to say, the edges 64 and 66 are substantially co-planar with the corresponding edges of the lamination. The length of the base is also such that the latter does not project sideways beyond the confines of the stack 30.

From one face of the base 60 extend two spaced prongs 70 with tapered ends 72, shown in FIGS. 5 and 8. The width and depth of the prongs are such that they are a tight fit in the lateral extensions 52 of the circular holes 50 in the stack 30 of laminations. As can be seen from a comparison of FIGS. 7 and 4, the extensions 52 are aligned with a diameter of the aperture 50 while the blocks 70 are disposed at a slight angle relative to the extensions 52. Thus, when the terminal block 58 is placed in position on the end of the stack, the prongs 70 are flexed and the resulting tension serves to hold the block in place until, during assembly of the field to its housing, a mounting bolt is inserted through apertures 62 and 50. Of course, any small angular displacement between the extensions 52 and prongs 70 may be used to produce this retaining force; the precise relationship shown in FIGS. 4 and 7 is not critical to this invention.

Alternatively, the prongs may be aligned with the extensions 52 and the faces of the prongs may be formed with ribs or teeth 71 as shown in the embodiment of FIG. 9 which, while not materially affecting the entry of the prongs into the extensions, increase substantially the difficulty of withdrawing the prongs.

From the other face of the base 60 extend two spaced projections 74, each having a central socket 76 channeled lengthwise as shown at 78, the channels extending slightly beyond the bases of the sockets.

The sockets are contoured as described to receive connector sleeve portions (not shown) of terminals 80 by means of which electrical connection can readily be made to the field coils. For example, the terminal may be of the form shown in U.S. Pat. No. 3,725,707 or in U.S. Pat. No. 3,760,339.

The stator assembly is put together by first assembling the stator laminations into a stack and then welding along the recesses 38. The stack is then placed into a coil winding machine which winds on the field coils 54 having first placed the sheets 56 in position. After winding, the coils are preferably impregnated with a molten plastic or varnish insulation which when set help to hold the coils in place.

The terminal blocks 58 are mounted upon the same end face of the stack of laminations by forcing the prongs 70 into the extensions 52 until the bases 60 of the blocks seat on the end face. The ends of the wires forming the field coil may be inserted into connector sleeves which have been forced into the sockets. Preferably, the sleeve is of a construction having a longitudinal, flexible finger bent to engage the slot 78 and be urged thereby, as the sleeve enters the socket, into tight engagement with a field coil wire in the sleeve. This sleeve structure is shown in U.S. Pat. No. 3,760,339. Alternatively, the field coil wire may be connected to a crimp portion of the terminal 80 and a lead wire or other circuit element may later be inserted into the sleeve portion of the terminal.

To mount the stack in position within a structure mounting bolts are passed through the holes 50 and into the structure. Such bolts also assist in retaining the connector blocks in place.

While in the embodiment described above the terminal block has two prongs, it will be appreciated that this is not essential and the blocks may, alternatively, have one or more prongs. In such cases, the stack will have one or more extensions associated with each aperture in the stack.

It will be appreciated that, in the stator assembly described above, the connector blocks do not extend radially beyond the confines of stack and thus do not add to the radial dimensions of the stack. Thus, no extra space is required in the structure just mentioned beyond that necessary to accommodate the radial dimensions of the stack with provision for the flow of cooling air is required. Furthermore, the terminal blocks do not project into the bore of the stack and do not reduce the clearance available to a rotor when mounted in position in the bore of the stack.

It will be understood that the stator may have more than two pole pieces. It has been proposed to employ a plurality of pairs of pole pieces in high frequency motors and the present invention is applicable to such motors. Each of the plurality of pole pieces has its own pair of winding slots. The apertures are located in the regions between adjacent pole pieces.

It may be found possible to secure the terminal blocks to the stack of laminations using only the mounting bolts referred to above. Alternatively, at least one of the connector blocks may be secured by means of the prongs alone while another or others may be held in position by a mounting bolt.

In the foregoing description and illustration, a particular embodiment of this invention has been specifically considered and certain alternatives described. Other changes and modifications will be apparent to those skilled in the art and it is intended that the appended claims cover all such changes as may fall within the true spirit and scope of this invention.

What we claim is:

1. A stator assembly for a dynamo electric machine comprising a plurality of laminations secured together to form a stack, the stack having at least two spaced pole pieces and a pair of coil slots per pole piece, a field coil in each one of the pairs of slots, apertures in said stack, each aperture being located in one of the regions between adjacent pole pieces, and electrically insulating terminal block positioned on said stack, each of said blocks being associated with one of said apertures, and each of said blocks having an external configuration corresponding to the region between said pole pieces and such that said blocks do not extend either externally of said stack in a radial direction or within said stack.

2. An assembly as claimed in claim 1 in which each terminal block includes at least one terminal support portion.

3. An assembly as claimed in claim 2 in which each terminal support portion supports terminal means adapted to connect electrically with the field coils.

4. An assembly as claimed in claim 3 and further comprising first terminal means supported by one of said blocks and second terminal means supported by the other block, said terminal means being adapted to receive and connect electrically with said field coils.

5. An assembly as claimed in claim 1 in which said apertures in said stack both include a cylindrical portion for receiving a stack mounting bolt, and in which each of said terminal blocks has an aperture aligned with one of the cylindrical portion of one of said apertures in said stack.

6. An assembly as claimed in claim 1 wherein each of said terminal blocks includes means extending from said block into the associated aperture for securing said block to said stack.

7. An assembly as claimed in claim 6 in which each aperture in the stack has a cylindrical portion for receiving a stack mounting block, and additionally each aperture has at least one lateral extension, and in which said means extending from each block comprises a prong which fits closely within said lateral extension.

8. An assembly as claimed in claim 7 in which the cylindrical portion of one aperture in the stack is located centrally of one region and the cylindrical portion of the other aperture in the stack is located centrally of the other region, and in which both apertures in the stack have two lateral extensions into which extend two prongs on said terminal block.

9. An assembly as claimed in claim 8 in which each terminal block has sockets for receiving electrical connectors.

10. An assembly as claimed in claim 9 and further comprising connector sleeves in each of the sockets, the sleeves being electrically connected to the field coil wires.

11. A wound field subassembly for a universal electric motor comprising a field core including a stack of annular laminations secured together; said core having two pole pieces, each of said pole pieces defining a pair of winding slots in said core; a coil of wire wound in each of said pairs of slots; a pair of apertures in said core, one in each of the regions between said pole pieces; a pair of insulating terminal blocks mounted on said core, each of said blocks including a terminal support portion; means on each of said blocks extending within one of said apertures for securing said blocks on said core, said blocks having an external configuration corresponding to said region between said pole pieces so that said blocks do not extend either outside of said core or within said core; a pair of terminal means for connecting said coils in a motor circuit supported by each of said blocks, each of said terminal means including a first portion connected to an end of one of said coils, and a second portion integral with said first portion and adapted to receive a connection to said circuit.

12. A wound field subassembly as claimed in claim 11 wherein each of said terminal blocks in provided with a circular aperture aligned with a circular portion of said aperture in said core to receive a field mounting bolt therein.

13. A wound field subassembly as claimed in claim 12 wherein said aperture in said core comprises a circular aperture centrally located in said region of said core and having circumferentially extending portions for receiving said extensions of said blocks.

14. A wound field subassembly as claimed in claim 11 wherein said aperture in said core comprises a central circular portion for receiving a mounting bolt therethrough and at least one laterally extending portion; and wherein said blocks include a finger sized to fit tightly within said lateral portion of said aperture.

15. A wound field subassembly as claimed in claim 14 wherein said aperture in said core includes a pair of laterally extending portions extending from said circular portion.

16. A wound field subassembly as claimed in claim 15 wherein said core and said blocks have a generally circular external configuration and wherein said blocks are shaped to conform to the internal configuration of said core region whereby said blocks permit insertion of said field subassembly within a tightly fitted housing and permit unobstructed flow of cooling air through the space between the ends of said pole pieces.

17. A stator assembly for a dynamo electric machine comprising a plurality of laminations secured together to form a stack, the stack having at least two spaced pole pieces and a pair of coil slots per pole piece, a field coil in each one of the pairs of slots, a pair of apertures in said stack, said apertures being positioned on opposite sides of said stack and intermediate said pole pieces, each of said apertures comprising a generally circular central portion and at least one lateral extension, a pair of electrically insulated terminal block means positioned on said stack and mounted adjacent each of said apertures, said terminal blocks each having a base portion, the configuration of said base portion corresponding to the configuration of said stack at the location of said aperture, each of said terminal blocks having a mounting portion extending within said aperture, said mounting portion being partially misaligned relative to said lateral extension of said aperture for retaining said block on said stack.

18. A stator assembly for a dynamo electric machine comprising a plurality of laminations secured together to form a stack, the stack having at least two spaced pole pieces and a pair of coil slots per pole piece, a field coil in each one of the pairs of slots, apertures in said stack, each aperture being located in one of the regions between adjacent pole pieces, and electrically insulating terminal block means positioned on said stack, each of said blocks being associated with one of said apertures, and each of said blocks having an external configuration corresponding to the region between said pole pieces and such that said blocks do not extend either externally of said stack in a radial direction or within said stack, each of said blocks including a mounting portion extending within said aperture, said mounting portions each including at least one rib extending parallel to said laminations to assist in retaining said terminal block on said stack.

19. A stator assembly for a dynamo electric machine comprising a plurality of laminations secured together to form a stack, said stack having at least two spaced pole pieces and a pair of coil slots per pole piece, a field coil located in each one of said pairs of coil slots, a pair of apertures in said stack, each aperture being located in a region between two adjacent ones of said pole pieces, and electrically insulating terminal block means positioned on an end of said stack, said terminal block means including mounting means extending into and retained within each of said apertures, said terminal block means having an external configuration corresponding to the configuration of said stack, said configuration of said terminal block means being at most substantially coextensive with the configuration of said stack.

20. A stator assembly for a dynamo electric machine comprising a plurality of laminations secured together to form a stack, said stack having at least two spaced pole pieces and a pair of coil slots per pole piece, a field coil located in each one of said pairs of coil slots, a pair of apertures in said stack, each aperture being located in a region between two adjacent ones of said pole pieces, and electrically insulating terminal block means positioned on an end of said stack, mounting means associated with each of said apertures for retaining said terminal block means on said stack, said terminal block means having an external configuration corresponding to at least a portion of the external configuration of said stack, said external configuration of said terminal block means being at most substantially coextensive with the external configuration of said stack.

21. A stator assembly as claimed in claim 20 wherein the internal configuration of said terminal block means substantially corresponds to the internal configuration of at least a portion of said stack whereby the space between adjacent coil slots is unobstructed when said terminal block means is mounted on said stack.

22. A stator assembly for a dynamo electric machine comprising a plurality of laminations secured together to form a stack, said stack having at least two spaced pole pieces and a pair of coil slots per pole piece, a field coil located in each one of said pairs of coil slots, a pair of apertures in said stack, and electrically insulating terminal block means positioned on an end of said stack, said terminal block means including mounting means extending into and retained within at least one of said apertures, said terminal block means having an external configuration substantially corresponding to the configuration of at least a portion of said stack, said configuration of said terminal block means being at most substantially coextensive with the configuration of said stack.

23. A field assembly having an electric motor comprising a plurality of laminations secured together to form a field stack, said stack having at least two spaced pole pieces and a pair of coil slots per pole piece, at least one aperture extending into said stack of laminations from one end thereof; and electrically insulating terminal supporting means positioned on one end of said stack, said terminal block means including mounting means extending into and retained within said at least one aperture, said terminal block means further including a base portion located on a portion of said stack, said base portion having an external configuration substantially corresponding to the configuration of at least a portion of said stack.

24. A field assembly as claimed in claim 23 wherein said configuration of said terminal block means is at most substantially coextensive with the configuration of said stack.

* * * * *

UNITED STATES PATENT OFFICE
CERTIFICATE OF CORRECTION

Patent No. 4,071,793     Dated January 31, 1978

Inventor(s) Denis Charles Cox

It is certified that error appears in the above-identified patent and that said Letters Patent are hereby corrected as shown below:

Top Title Sheet, after the line:

[22] Filed: Mar. 23, 1977 insert

Foreign Application Priority Data

July 30, 1974    United Kingdom of Great Britain

............ 33581/74

Column 2, line 56, "is" should read --it--.

Signed and Sealed this

Sixth Day of June 1978

[SEAL]

Attest:

RUTH C. MASON
*Attesting Officer*

DONALD W. BANNER
*Commissioner of Patents and Trademarks*